United States Patent [19]

Yussen

[11] 3,748,402

[45] July 24, 1973

[54] APPARATUS FOR PREVENTING THE DIALING OF CERTAIN TELEPHONE NUMBERS

[75] Inventor: Albert Yussen, Philadelphia, Pa.

[73] Assignee: Telecommunications Corporation of America, Philadelphia, Pa.

[22] Filed: Sept. 27, 1971

[21] Appl. No.: 183,930

[52] U.S. Cl. .......... 179/90 D
[51] Int. Cl. .......... H04m 1/66
[58] Field of Search .......... 179/90 D, 1 C

[56] References Cited

UNITED STATES PATENTS

| | | | |
|---|---|---|---|
| 3,358,087 | 5/1964 | Von Stein | 179/90 D |
| 3,511,939 | 3/1967 | Aikawa | 179/90 D |
| 3,515,806 | 9/1968 | Spraker | 179/1 C |
| 3,284,578 | 11/1966 | Evans | 179/90 D |

FOREIGN PATENTS OR APPLICATIONS

| | | | |
|---|---|---|---|
| 1,167,395 | 4/1964 | Germany | 179/90 |

*Primary Examiner*—Kathleen H. Claffy
*Assistant Examiner*—Kenneth Richardson
*Attorney*—Arthur H. Seidel, Joel S. Goldhammer et al.

[57] ABSTRACT

Apparatus for preventing the dialing of toll call telephone numbers using a public utility rotary dial telephone. The apparatus permits local telephone calls to be completed and can be disabled to permit toll calls by a key operated assembly. The apparatus can also be converted into a local call pay telephone.

10 Claims, 12 Drawing Figures

INVENTOR
ALBERT YUSSEN
BY
Seidel, Gonda & Goldhammer
ATTORNEYS.

INVENTOR
ALBERT YUSSEN
BY
Seidel, Gonda & Goldhammer
ATTORNEYS

INVENTOR
ALBERT YUSSEN
BY
Seidel, Gonda & Goldhammer
ATTORNEYS.

INVENTOR
ALBERT YUSSEN
BY
Seidel Gonda & Goldhammer
ATTORNEYS.

INVENTOR
ALBERT YUSSEN

BY
Seidel, Gonda & Goldhammer
ATTORNEYS.

INVENTOR
ALBERT YUSSEN
BY
Seidel, Gonda & Goldhammer
ATTORNEYS.

APPARATUS FOR PREVENTING THE DIALING OF CERTAIN TELEPHONE NUMBERS

This invention relates to apparatus for preventing the dialing of certain telephone numbers. More particularly, this invention relates to apparatus for preventing toll calls from being made through a standard rotary dial telephone.

Often it is desirable to limit the use to which a telephone can be put. For example, it may be desirable to permit a telephone to be freely used for making local, non-toll, calls but at the same time prevent long distance telephone or other toll calls from being made with the same telephone instrument. The present invention is directed toward accomplishing the foregoing and other functions.

Most public utilities offer telephone systems which automatically lock out or regulate toll calls. However, every person or establishment which has need for such a system cannot use such systems because they are adapted only for large scale users. The present apparatus is adapted for use with a single telephone.

In certain instances it may be desirable to convert an existing telephone into a pay telephone for use in making non-toll calls only. The present invention provides apparatus which permits a utility supplied dial telephone to be converted into a pay telephone that prevents long distance calls from being placed from the telephone instrument.

The present invention is designed for use with a standard utility-furnished telephone. Its primary function is to prevent the dialing of preselected digits that are necessary for making a toll call. Thus, the apparatus prevents a telephone from being used to dial telephone numbers for which there would be a charge over and above the basic telephone rental and the so-called message units. More specifically, the present invention prevents the dialing of "1" or "0" (Operator) until at least two other digits have been dialed. The effect of this is to preclude the dialing of long distance telephone numbers or telephone numbers which are outside the so-called local calling area. Ordinarily, a toll call requires the telephone user to:

1. Dial 211 and request the Operator to complete the call;
2. Dial 1, the area code, and the seven digit telephone number; or
3. Dial "0" (Operator), the area code and the seven digit telephone number.

All of the above listed procedures are prevented by the apparatus described herein. Of course, the prevention of dialing "1" or "0" until at least two other digits have been dialed is exemplary only. Those skilled in the art will recognize that the apparatus can be designed to prevent the dialing of other numbers such as "9" or even locking out a specific number until three or more digits have been dialed.

The apparatus is designed to fit over both the dial and the hook-switch buttons of a utility-supplied telephone. The hand set of a utility-supplied telephone fits into a cradle provided with the apparatus. The apparatus is locked to the utility telephone so that it cannot be bypassed. The apparatus of the present invention also provides a dial finger wheel and finger stop similar to the conventional dial finger wheel and finger stop of the utility telephone. The dial finger wheel is mechanically linked to the utility dial finger wheel through a mechanism which provides the toll diversion.

For the purpose of illustrating the invention, there are shown in the drawings forms which are presently preferred; it being understood, however, that this invention is not limited to the precise arrangements and instrumentalities shown.

Referring now to the drawings in detail, wherein like numerals indicate like elements, there is shown in FIG. 1 an apparatus for preventing the dialing of certain telephone numbers designated generally as 10. Such apparatus may hereinafter be referred to as a toll diversion mechanism.

Figure 1:
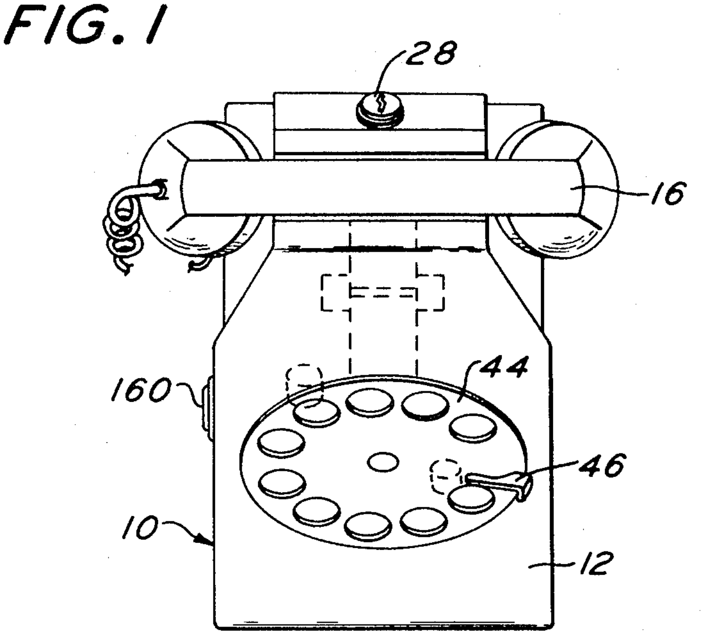
FIG. 1 is a top plan view of the apparatus for preventing dialing of certain telephone numbers.

As shown, the apparatus includes a housing 12 which fits over and covers both the dial and the hook-switch buttons of the utility-supplied telephone. The apparatus described herein is designed for use with a standard utility-supplied rotary dial telephone such as the telephone manufactured by Western Electric Corporation, Model 500 (or equivalent). The utility telephone is designated by the numeral 14 and also includes a hand set 16 which is shown in FIG. 1 resting in a cradle 18 that forms a portion of the toll diversion mechanism 10.

The toll diversion mechanism 10 is maintained in position on the utility telephone 14 by a base plate 20 that is hingedly connected to the housing 12 at hinge 22. The base plate 20 is hinged to a rear plate 24 that engages the housing 12 by means of a latch mechanism 26 that is operated by a key lock 28. Thus, the toll diversion mechanism 10 is fixedly maintained in position on the utility telephone 14 and cannot be removed except by an authorized person having possession of a key which fits the key lock 28.

When the telephone is not in use, hand set 16 rests in cradle 18. The weight of hand set 16 depresses the hook-switch buttons 30 which reciprocate through openings in the base of cradle 18. The hook-switch buttons 30 push against the T-plate 32 which is hingedly connected to the reset ring 34. The T-plate also depresses the utility telephone hook switch buttons 42. Moreover, the aforesaid hinge connection 36 is fixed within the housing 12 so that the hinge joint also acts as a pivot point for the T-plate 32 and reset ring 34. The depression of the T-plate 32 and consequent lifting of the reset ring 34 initiates the resetting of the entire mechanism for a subsequent telephone call in a manner to be described hereinafter. The angle pieces 38 and 40 bear against each other to cause T-plate 32 to lift the reset ring 34.

When the hand set 16 is lifted from the cradle 18, the hook switch buttons 30 are free to move upwardly as is the T-plate 32 under pressure generated by the utility telephone hook switch buttons 42. Thus, the reset ring 34 drops down relative to the position shown in FIG. 2. Thus, with the hand set 16 removed from the cradle 18, a normal dial tone will be heard in the hand set receiver. Accordingly, the user can commence dialing.

To dial the telephone 14, the user turns the finger wheel 44 clockwise in the conventional manner until his finger firmly contacts the finger stop 46. The finger is removed and the finger wheel 44 is allowed to rotate counterclockwise until it is stopped by the finger wheel stop index 48. In the manner described below, this action simultaneously drives the finger wheel 50 of utility telephone 14. Any digit 2 through 9 may be dialed and the call completed. However, if a 1 or 0 is dialed during the first two clockwise operations of the finger wheel 44, then the mechanism interconnecting finger wheel 44 with finger wheel 50 is disengaged and the utility telephone 14 can no longer be operated.

Finger wheel 44 is fixed to finger wheel flange 52 by means of screws through holes 54. Flange 52 is fixed to shaft 56 by set screw 58. Shaft 56 extends through bushing 60 which is fixed in the top surface of housing 12. Finger wheel return spring 62 is positioned concentric with shaft 56 and has one end fixed in the bushing 60 and the other end fixed in the finger wheel 44. Finger wheel stop index 48 permits the finger wheel 44 to rotate through approximately 355°.

Shaft 56 extends through bushing 60 and is fixed to main cam 64 by any conventional means such as a force fit. Thus, main cam 64 rotates with finger wheel 44.

The main cam 64 has a cam slot 66 milled or otherwise formed therein. The cam slot 66 is shaped to provide the toll diversion when a "1" or "0" is dialed on the first two turns of the finger wheel 44 in the manner described herein. A diverting gate 68 rotates about pin 70 and is normally biased against the outer peripheral wall of cam slot 66 by a spring (not shown). Mounted on the surface of the main cam 64 is a counter driving cam 72 which pivots about counter driving cam pin 74 and is normally biased by spring 76 against counter driving cam limit pin 78. Mounted on the periphery of cam 64 is latch dog 80 which rotates about pivot pin 82. Latch dog 80 is restricted in the amount of its counterclockwise movement by latch dog limit pin 84 and in the amount of its clockwise rotation by latch dog limit pin 85.

Figure 3:
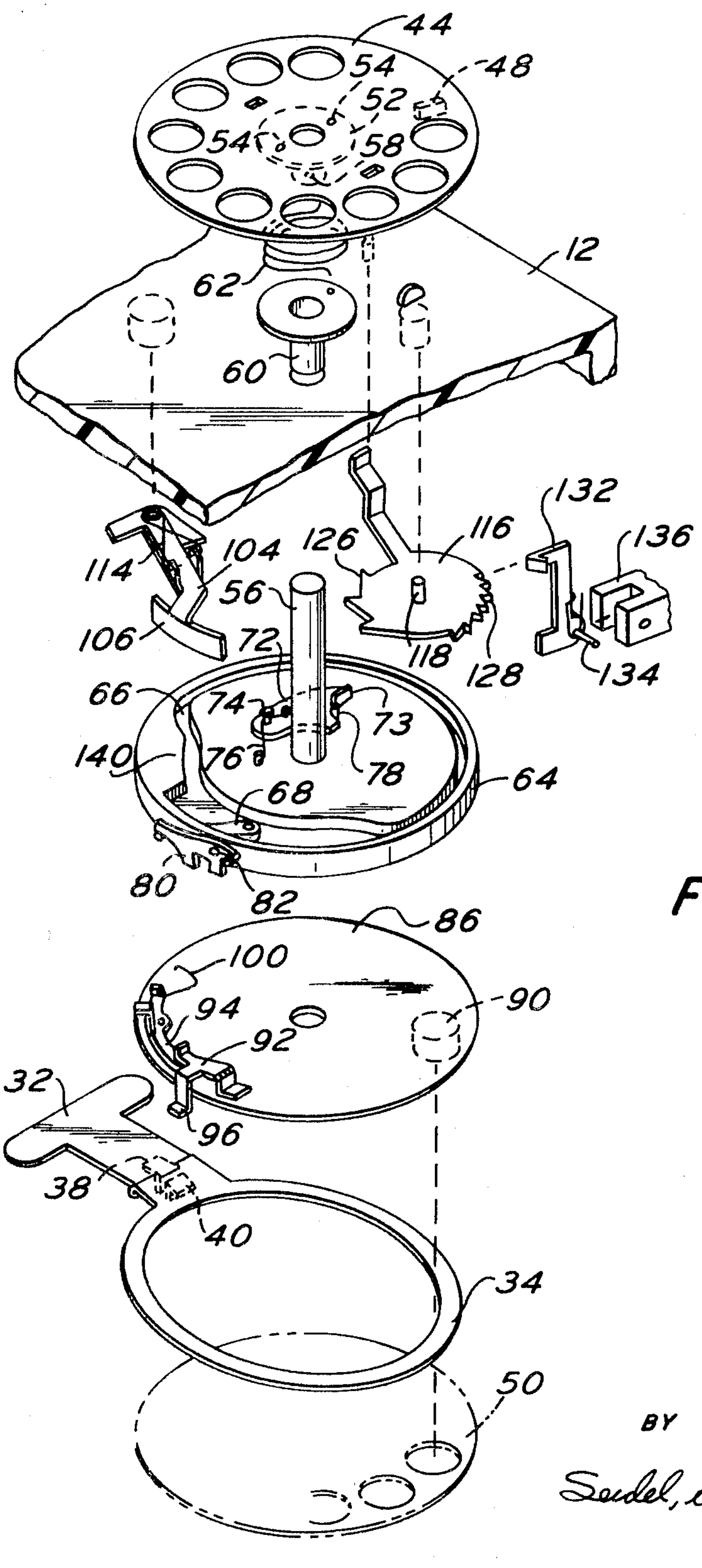
FIG. 3 is an exploded view of the dial mechanism for the apparatus.

The dial drive plate 86 is mounted for free rotation on the main shaft 56 between appropriate spacing washers 88. As best shown in FIG. 3, the dial drive finger 90 is mounted on the dial drive plate 86 and fits into the "0" hole of the utility telephone finger wheel 50. Thus, the amount of rotation of finger wheel 50 depends upon rotation of dial drive plate 86.

Figure 8:
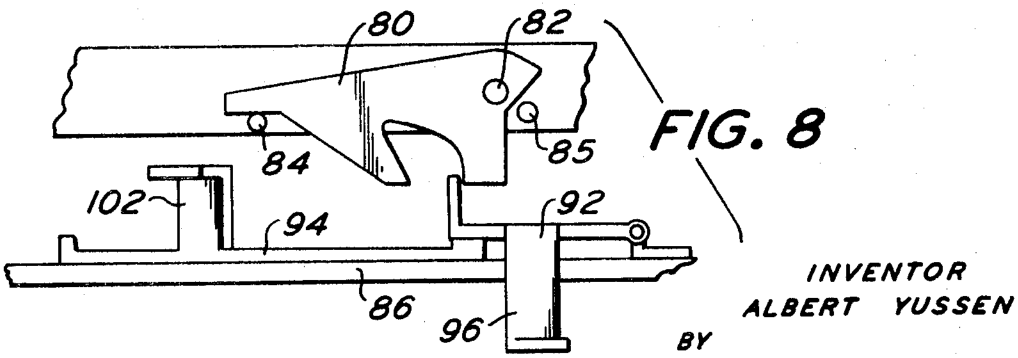
FIG. 8 is an enlarged partial sectional view taken along the line 8—8 in FIG. 4.
Figures 5, 6, 7:
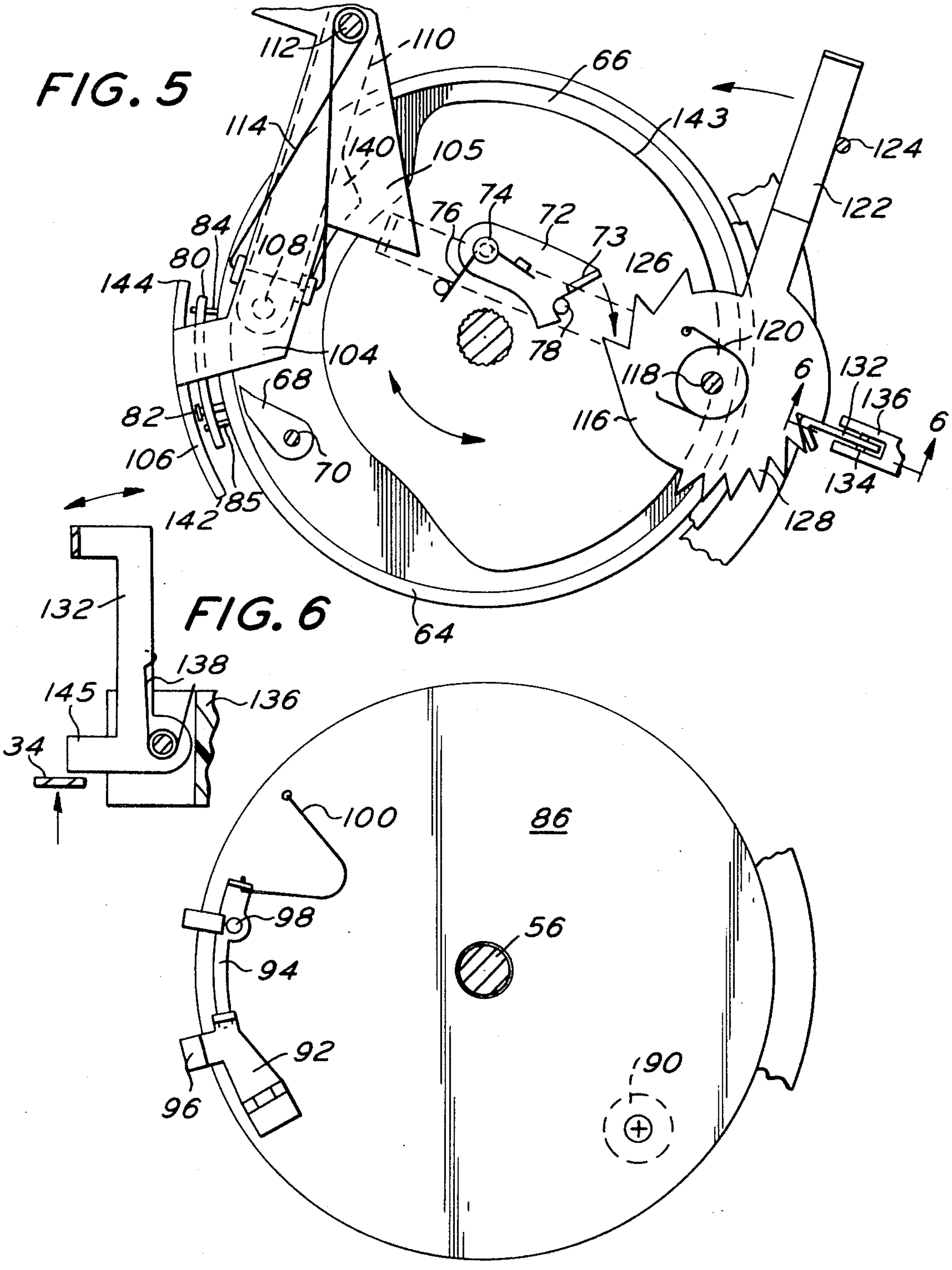
FIG. 5 is a plan view of a portion of the apparatus taken along the line 5—5 in FIG. 4.
FIG. 6 is an enlarged view of a portion of the mechanism taken along the line 6—6 in FIG. 5.
FIG. 7 is a partial plan view taken along the line 7—7 in FIG. 4.

Angular rotation of the dial drive plate 86 is controlled by means of the latch dog 80 which engages or does not engage the hinge plate 92 fixed to the dial drive plate. Engagement or non-engagement of the latch dog 80 with the hinge plate 92 is controlled by the trigger 94. As best shown in FIG. 8, hinge plate 92 is hingedly fixed to dial drive plate 86 and includes a dependent tail with protruding shoulder 96. As shown in FIG. 7, trigger 94 is pivotally connected to dial drive plate 86 by trigger pivot pin 98 and it is normally biased by trigger spring 100 to a position wherein a portion thereof rests under hinge plate 92. Trigger 94 includes a trigger top portion 102 that engages the sector 106 on the trigger lever 104 to permit the hinge plate 92 to drop down and be released from engagement with the dog 80.

Figure 4:
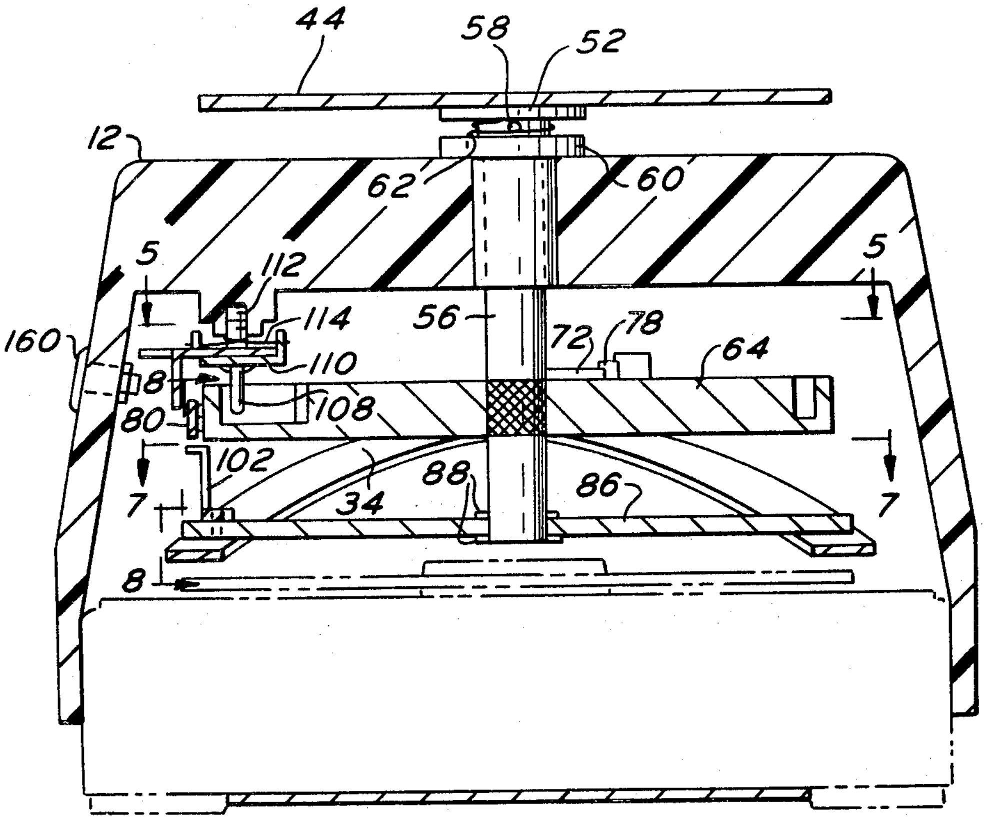
FIG. 4 is a partial sectional view of the apparatus taken along the line 4—4 in FIG. 2.

As best shown in FIGS. 4 and 5, the cam follower pin 108 extends into cam slot 66 and is held therein by cam follower lever 110. Cam follower lever 110 and trigger lever 104 are commonly pivoted about a pivot pin 112 that is screwed into a boss depending from housing 12. A spring washer is positioned between the head of pin 112 and the cam follower lever 110 so that the cam follower lever and trigger lever normally frictionally engage each other and tend to move together in the manner of a clutch assembly. Stated otherwise, cam follower lever 110 and trigger lever 104 tend to rotate together about pin 112 as directed by the cam follower pin 108 as cam slot 66 moves past it. As thus constructed, cam follower lever 110 can either move with trigger lever 104 or it can rotate apart from it if trigger lever 104 is constrained.

Cam follower lever spring 114 extends around pin 112 and engages upright projections on trigger lever 104 and cam follower lever 110. The purpose of spring 114 is to normally bias the trigger lever 104 and cam follower lever 110 into mutually parallel relationship as shown in FIGS. 4 and 5. Thus, should the action of the cam slot 66 upon cam follower pin 108 cause the trigger lever 104 and cam follower lever 110 to scissor open to angularly related positions, then the spring 114 will bring them back into parallel relation when they are released.

As best shown in FIGS. 3, 5 and 6, the counter wheel 116 is pivotally fixed in housing 12 by counter wheel pin 118. Counter wheel spring 120 has one end fixed to the housing 12 and the other end fixed to the counter wheel 116. Counter wheel spring 120 normally urges the counter wheel 122 into engagement with stop pin 124.

The periphery of counter wheel 116 is provided with teeth at two sectors thereof. Teeth 126 are spaced 30° apart and define a counting sector. Teeth 128 are spaced 15° apart and define a latching sector.

As best shown in FIGS. 5 and 6, counter wheel pawl 132 is pivotally mounted on counter wheel pawl pin 134 which in turn is supported in bifurcated support member 136 which is fixed to the housing 12. As best shown in FIG. 6 pawl 132 is normally biased into engagement with teeth 128 by pawl spring 138.

It should be noted that the finger holes in a conventional dial wheel are spaced out at 30° intervals with the number 1 hole positioned 60° from the finger stop. If the finger stop be designated as the 0° position, then the number 1 hole is at the 60° position and the "0" (Operator) finger hole is at the 330° on a finger wheel. The foregoing designations of relative positions are provided for purposes of explaining the operation of the mechanism described above.

If the first or second digit dialed is a "1," the main cam 64 will be rotated 60°. Therefore, the cam follower pin 108 will be pushed by the diverting gate 68 toward the center axis of the main cam 64. Cam follower pin 108 is positioned approximately 30 angular degrees from the pivot pin 70 of gate 68. The movement of cam follower pin 108 toward the axis of rotation also draws in cam follower lever 110 as well as trigger lever 104 which is frictionally engaged with it. Such movement brings sector 106 which is dependent from trigger lever 104 close to the periphery of dial drive plate 86. When the finger wheel 44 is released, the main cam 64 and the dial drive plate 86 will rotate as a unit in the counterclockwise direction. During such counterclockwise rotation, the upstanding portion 102 of trigger 94 will be engaged by the edge 144 of sector 106 and the trigger will be pivoted outwardly so that it will move out from under hinge plate 92. Hinge plate 92 will therefore drop down and be released from engagement with dog 80. Once the hinge plate 92 has dropped out of engagement with the dog 80, the dial drive plate is freed. Accordingly, the dial drive plate 86 can no longer be rotated by rotation of the finger wheel 44.

Similarly, if the first or second digit dialed is a "0" (Operator), the cam follower pin 108 is again moved toward the rotary axis of shaft 56 by the main cam secondary lobe 140. The lobe 140 is positioned such that the cam follower pin 108 is moved inwardly at a rotation angle of 310° which in effect moves it into the center after the numeral "9" has passed the finger stop but before the finger hold for the "0" reaches the finger stop. When the finger wheel 44 is released, the main cam commences rotation in a counterclockwise direction. However, the sector 106 has been biased against its periphery. As the trigger 94 is carried around by the dial drive plate 86, the edge 142 will strike the upright trigger portion 102 causing the trigger to move out from under the hinge plate 92. This occurs after approximately 310° of rotation of the dial wheel commences from the start position.

The foregoing illustrates how the digits "1" and "0" are effectively locked out if operated on the first two dialings of the finger wheel 44.

Since many telephone numbers incorporate a "1" or "0" after the first two digits, it is necessary to provide means for preventing the disengagement of the dial drive plate 86 from the dog 80 and hence the main cam 64. This is the function of the counter wheel 116.

Strike plate 73 on counter driving cam 72 is positioned 30° from the face of teeth 126. This means that as the counter driving cam 72 reaches the 30° position during rotation of main cam 64, it engages a tooth of the counter wheel 116 and causes the counter wheel to rotate 30° counterclockwise. The counter wheel 116 is held in that position by the pawl 132 which ratchets along teeth 128. As the finger wheel 44 is released, the entire rotating assembly on the main shaft returns to its starting position, except the counter wheel 116 which has been displaced 30° counterclockwise.

During the counterclockwise rotation of the main cam 64 to its starting position, the cam follower pin 108 is adjacent the outer periphery of the cam slot 66 and passes through the spring loaded diverting gate 68 adjacent to said periphery. By maintaining the cam follower pin 108 adjacent to the outer periphery of the cam slot 66, the arc sector 106 of the trigger lever 104 is prevented from striking the trigger 94. Stated otherwise, the arc sector 106 can strike the trigger 94 only if it is moved inwardly adjacent the outer periphery of the dial drive plate 86.

The second digit dialed results in a counterclockwise rotation of the counter wheel 116 by an additional 30°. The dial drive plate 86 remains latched to the main cam 64 by means of the hinge plate 92 and the latch dog 80 so long as a "1" or "0" is not dialed.

When the third digit is dialed, the counter wheel 116 moves an additional 30°. This brings the disabling finger 122 into engagement with the triangular portion 105 of the trigger lever 104 causing the arc sector 106 to move away from the periphery of the dial drive plate 86 and to be held in that position. It is held in that position because the pawl 132 maintains the counter wheel 116 in engagement with the trigger lever 104. Subsequent digit dialing causes no further movement of the counter wheel 116. Therefore, any digit may thereafter be dialed since the sector 106 cannot be brought over adjacent to the periphery of dial drive plate 86. Since the cam follower lever 110 can move with respect to the trigger lever 104, cam follower pin can still follow cam slot 66.

It should be noted that the main cam primary lobe 143 maintains the cam follower pin 108 adjacent to the outer periphery of the cam slot 66 except in those sectors where the digits "1" or "0" are to be blocked out. It should also be noted that by repositioning the disabling finger 122 and changing the number of teeth in the counting wheel 116, the exclusion of the digits "1" and "0" could be extended to the first three or four digit dialings. Similarly, by changing the contour of the main cam slot 66, a digit other than "1" or "0" could be excluded.

Figure 2:
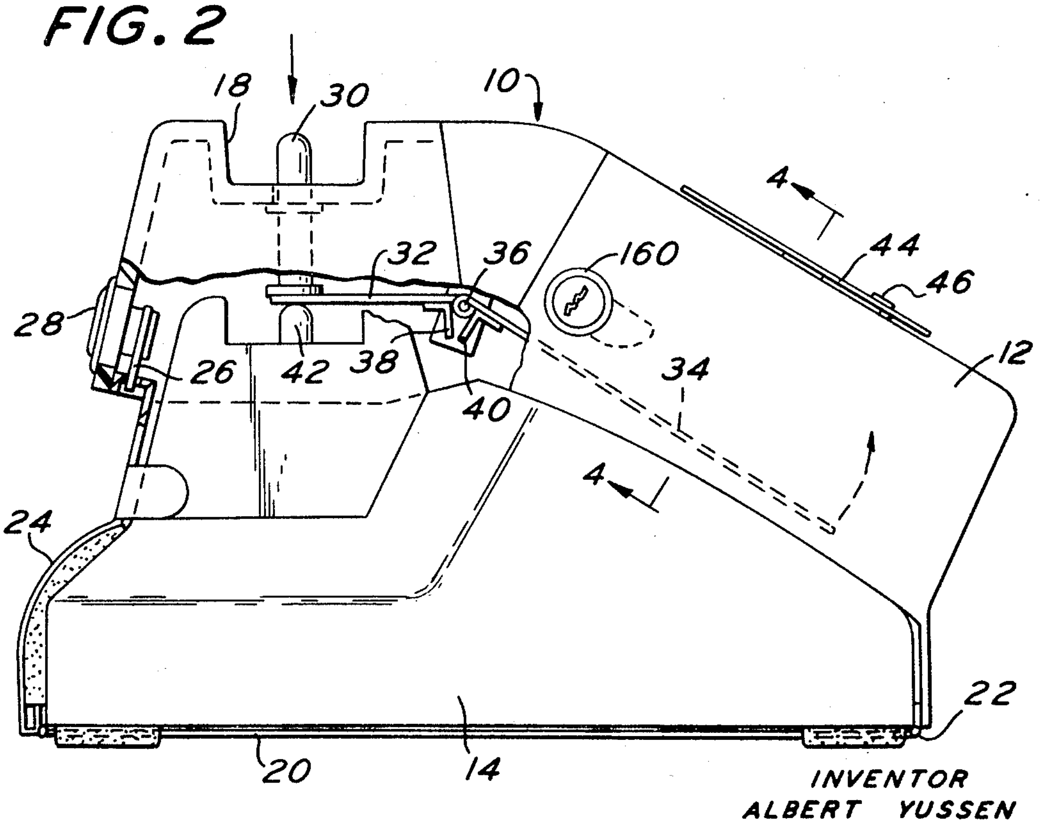
FIG. 2 is a side elevational view of the apparatus for preventing the dialing of certain telephone numbers, with a portion of the housing cut away to show the operation of the cradle buttons.

As the completion of a call, or if "1" or "0" are dialed, or at any other time, it is necessary to reset the counter wheel 116 to its initial position against stop pin 124. This is accomplished by depressing hook switch buttons 30. This action depresses T-plate 32 and biases reset ring 34 upwardly as shown in FIG. 2. The upward movement of reset ring 34 brings it into engagement with the arm 145 projecting from pawl 132. Pawl 132 therefore moves out of engagement with teeth 128, permitting the spring 120 to return the counter wheel 116 to its initial position. Reset ring 34 also engages tail 96 depending from hinge plate 92 and lifts the same. This permits the trigger 94 to be moved by spring 100 back under hinge plate 92. Thus, the mechanism is again reset for the next number to be dialed.

It may in some circumstances be desirable to make a toll call without first removing the toll diversion mechanism 10 from the utility telephone 14. This is accomplished by the key operated cam 160 which simply rotates a cam upwardly between the sector 106 and the dial drive plate 86. Therefore, the sector cannot move against the periphery of the dial drive plate 86 even on the first or second dial digit. Accordingly, the toll diversion mechanism is rendered inoperative.

Figure 9:
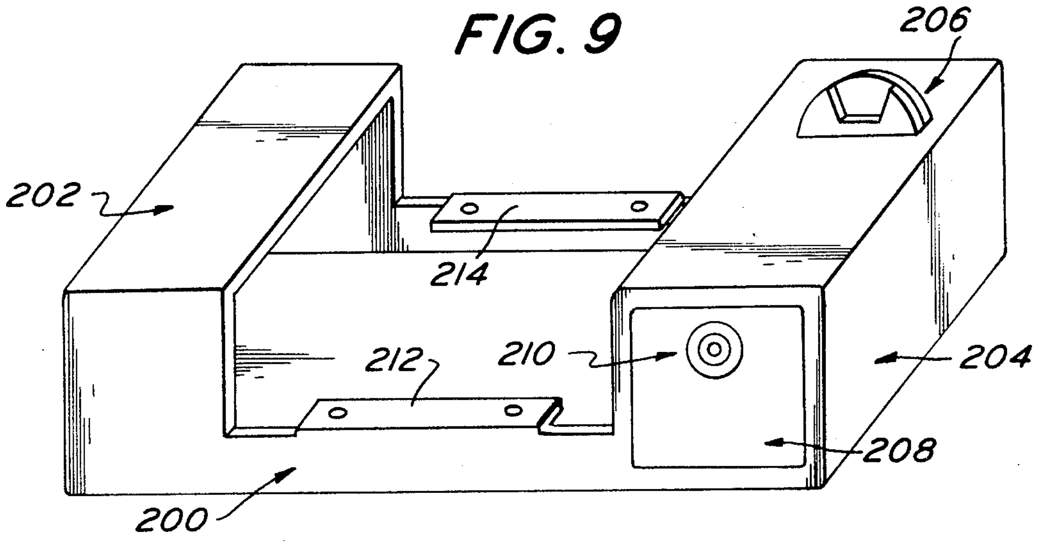
FIG. 9 is a perspective view of a structure for housing electronic and other circuitry for converting the apparatus into a coin phone.
Figure 11:
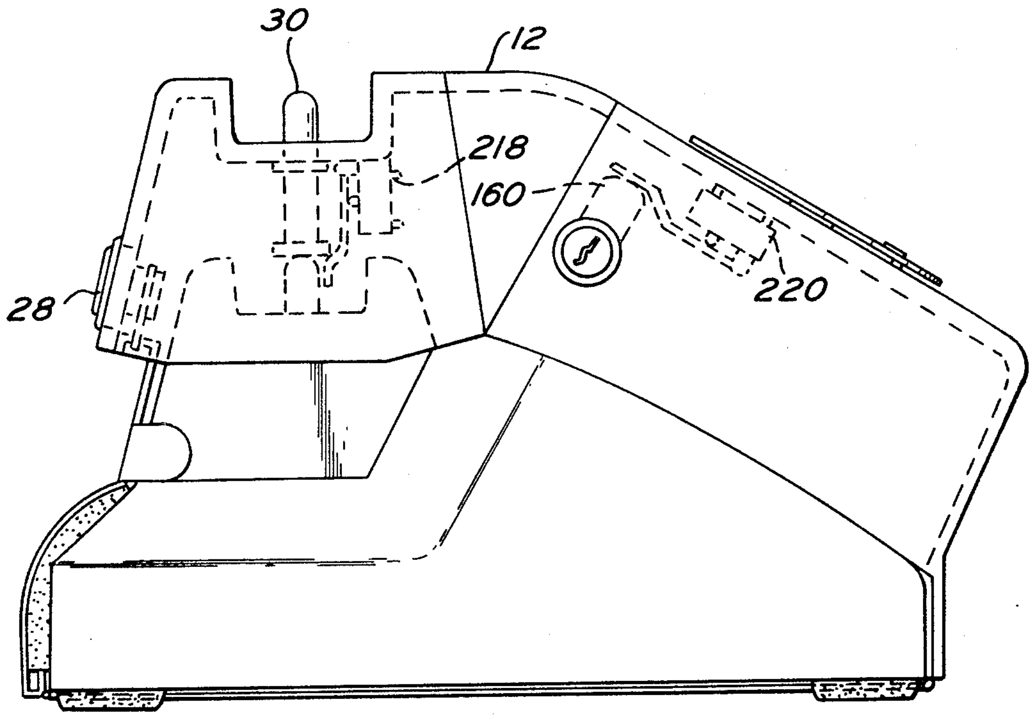
FIG. 11 is a partial elevational view showing structural modifications which must be made to convert the toll diversion apparatus into a coin phone.
Figure 10:
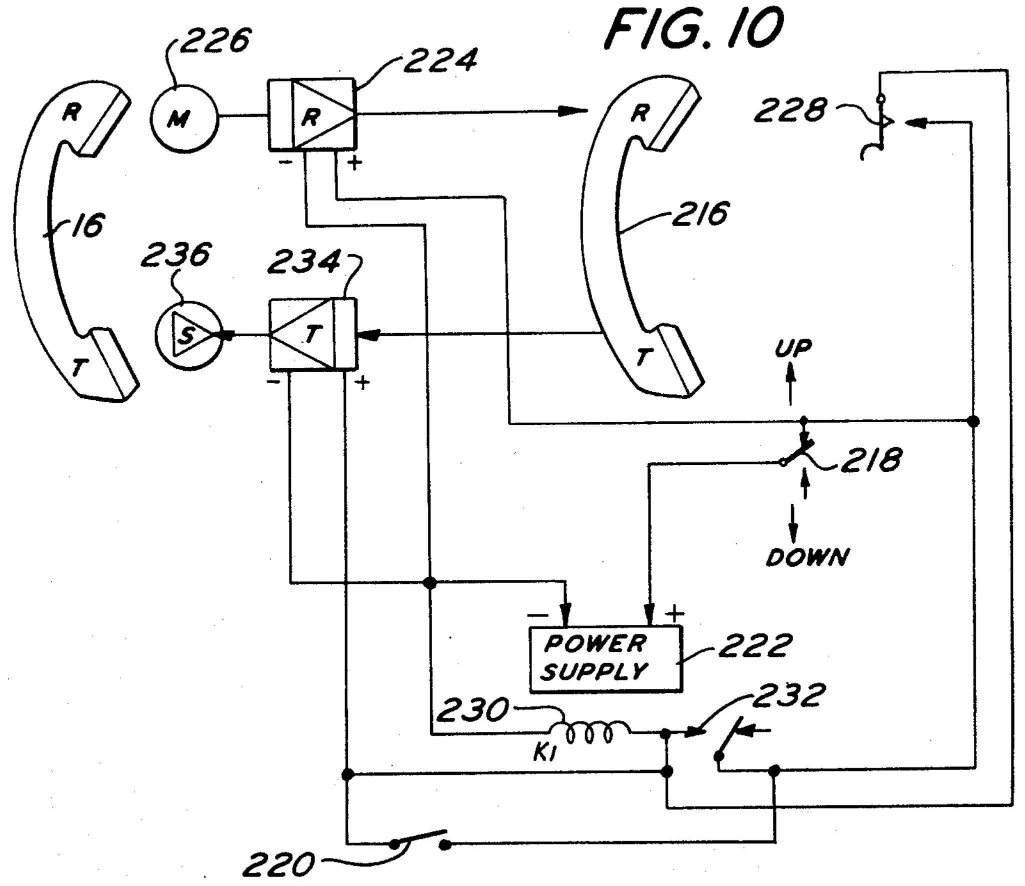
FIG. 10 is a schematic diagram of a circuit used for converting the toll diversion mechanism into a coin phone.

Referring now to FIGS. 9, 10 and 11, there is shown a mechanism and an electronic circuit for converting the toll diversion mechanism 10 into a toll telephone for making only local calls. Stated otherwise, the mechanism to be described permits a public utility telephone to be converted into a coin or toll telephone by modifying the toll diversion mechanism 10.

Referring now to FIG. 9, there is shown a housing 200 for mounting the toll diversion mechanism 10, as modified, and the public utility telephone 14 to thus provide a toll telephone. The housing 200 includes a hand set section 202 for retaining the public utility hand set 16. The housing 200 also includes a coin mechanism 204 as an integral part thereof. The coin mechanism 204 consists of a coin slot 206, a coin box 208 and a coin box lock 210. Intermediate the coin mechanism 204 and the hand set section 202 are a pair of mounting flanges 212 and 214 to which the base plate 20 may be fixed as by screws or other appropriate fasteners. Thus, the public utility telephone 14 together with the toll diversion mechanism 10 is positioned between the hand set section 202 and the coin mechanism 204.

The hand set section 202 houses in addition to the public utility telephone hand set 16, most of the electronics shown schematically in FIG. 10. Thus, it houses the necessary voice grade operational amplifiers, a power supply, preferably in the form of a battery, acoustic couplers, relays and other switch mechanisms, and appropriate mounting means for the utility telephone hand set.

In operation, the public utility telephone hand set 16 is positioned inside the hand set section 204 and appropriately mechanically connected to acoustic couplers for transmission and reception of two way conversation. With the public utility telephone and toll diversion mechanism 10 fixed to the flanges 212 and 214, the hand set 16 cannot be removed.

As best illustrated in FIG. 10, a hand set 216 is provided with the mechanism for use by the caller. In use, hand set 216 is placed into the hand set cradle 18 of the toll diversion mechanism 10 and becomes the primary control transmission and reception hand set.

When the hand set 216 is lifted from the cradle 18, the normal upward pressure of the utility hook switch buttons 42 will cause the T-plate 32 to pivot about hinge 36 in an upward direction. The T-plate will pivot upwardly and engage the microswitch 218 which is positioned as a modification inside the housing 12 of the toll diversion mechanism 10. This moves the microswitch 218 into the circuit position illustrated in FIG. 10.

The toll diversion mechanism 10 is further modified by the provision of a microswitch 220 which can be operated to disable the toll function as described in detail hereinafter.

Referring now to FIG. 10, it can be seen that the operation of microswitch 218 by the T-plate 32 completes a circuit from power supply 222 to the receive operational amplifier 224. As has been previously explained, this releases the utility telephone hook switch buttons 42. The acoustic coupler 226 connected to the receiver end of the hand set 16 picks up the dial tone and transmits it through receive operational amplifier 224 to the receiver of hand set 216. Thus, the user hears the dial tone generated by the public utility system in the utility telephone.

A local call may now be dialed. This is accomplished in the manner described above in respect to the operation of the toll diversion mechanism 10. If the called line is busy, or if the caller attempts to place a toll call, or if the call is not completed for any other reason, the caller hangs up by replacing hand set 216 in the cradle 18 or by depressing the hook switch buttons 30. If, on the other hand, the call is completed, the caller must deposit a coin in order to turn on the transmitter circuit.

The deposition of a coin through coin slot 206 causes the momentary closure of coin switch 228 which may be a conventional microswitch responsive to the passage of a coin down a coin chute. The momentary closing of coin switch 228 completes a circuit from power supply 222 through microswitch 218 to relay coil 230. This causes relay switch 232 to latch closed and thereby complete a circuit between power supply 222 and transmit operational amplifier, thereby energizing the latter. Acoustic coupler 236 couples the output of amplifier 234 into the microphone portion of public utility hand set 16. Transmit operational amplifier 234 couples the output of the transmitter in hand set 216 into the transmitter of utility phone 14 through acoustic coupler 236. Thereafter, a normal two way telephone transmission may take place.

When the transmission is completed, the caller replaces hand set 216 in cradle 18. This opens microswitch 218 and thereby disconnects power to the electronic circuit. Moreover, the hook switch 42 of the utility telephone is depressed by the action of T-plate 32, thereby effectively "hanging up" the utility telephone.

From the foregoing, it may be seen that a mechanism has been provided for converting a utility telephone into a toll phone for the making of local calls.

Should the owner or lessee of the toll diversion mechanism 10 and the associated mechanism for converting it into a toll call phone wish to make a telephone call without the necessity of depositing a coin, he may do so by inserting a key into the toll diversion disabling mechanism and thereby rotating the cam 160 in a counterclockwise direction. This moves the cam past the actuator of toll diversion microswitch 220 to momentarily close the same. At the same time, cam 160 disables the toll diversion mechanism by moving between the sector 106 and the dial drive plate 86.

The momentary closing of toll diversion switch 220 energizes relay coil 230 thereby latching relay switch 232 in a closed position. For reasons already explained, this turns on transmit operational amplifier 234 thereby removing the necessity for depositing a coin. It also simultaneously permits the making of a toll call.

Figure 12:
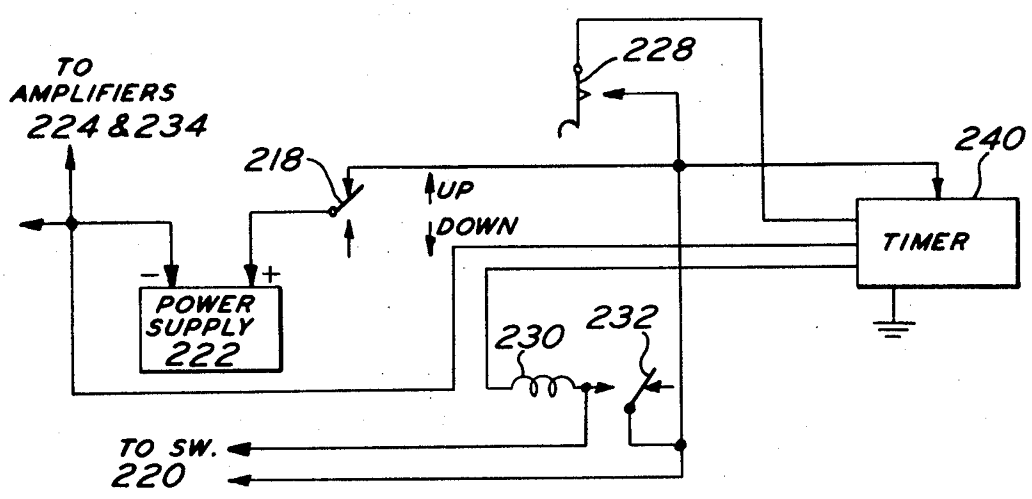
FIG. 12 is a schematic circuit diagram of a further modification to the apparatus for limiting the amount of time on a call.

Referring now to FIG. 12, there is shown a modification of the circuit illustrated in FIG. 10 for limiting the amount of time that the toll mechanism can be used. Like numerals have been used to indicate like elements. Accordingly, it may be immediately observed that the circuit is essentially the same except that the coin switch is now connected to timer 240. Timer 240 is energized through the operation of microswitch 218. Timer 240 is a conventional timing mechanism that begins to count down when a coin is deposited into the coin slot 206 and thereby closes coin switch 228. A voltage pulse initiates a timing circuit. The timing circuit controls the completion of energy through the relay coil 230 from the power supply 222. Thus, when the timer times out, it opens the circuit between power supply 222 and relay coil 230, thereby disabling transmit operational amplifier 234.

It should be apparent from the foregoing that there has been provided a circuit for controlling the amount of time that the mechanism described herein can be used to operate a utility telephone.

The present invention may be embodied in other specific forms without departing from the spirit or essential attributes thereof and, accordingly, reference should be made to the appended claims, rather than to the foregoing specification as indicating the scope of the invention.

I claim:

1. An apparatus for preventing the dialing of certain telephone numbers but permitting all others to be dialed, comprising means for affixing said apparatus to a (public utility) telephone having a rotary finger dial wheel, dial wheel drive means in said apparatus for interconnecting with said telephone dial wheel and rotating the same, having the said apparatus finger dial wheel for dialing a telephone number, a mechanism for interconnecting said apparatus finger dial wheel with said drive means so that rotating said apparatus finger dial wheel also rotates said telephone finger wheel has, said interconnection mechanism including mechanical means to prevent the dialing of a predetermined dial digit at a predetermined position in a dialing sequence.

2. Apparatus for preventing the dialing of certain telephone numbers in accordance with claim 1 wherein said prevention means includes means to disconnect said apparatus dial wheel from said drive means when a predetermined dial digit is dialed at a predetermined position in a dialing sequence, but not otherwise.

3. Apparatus for preventing the dialing of certain telephone numbers in accordance with claim 1 wherein said prevention means comprises means to disconnect said apparatus dial wheel from said drive means, said disconnect means comprising a latch mechanism normally interengaging said drive means to said dial wheel, and means to open said latch mechanism if a predetermined dial digit is dialed at a predetermined position in a dialing sequence.

4. Apparatus for preventing the dialing of certain telephone numbers in accordance wuth claim 3 wherein said means to open said latch mechanism comprises a trigger mechanism, and counter means controlling said trigger mechanism by counting the number of digits dialed and rendering said trigger means operative or inoperative as a function of the number of digits which have been dialed.

5. Apparatus for preventing the dialing of certain telephone numbers in accordance with claim 1 wherein said means for affixing said apparatus to a public utility telephone includes a key operated lock mechanism.

6. Apparatus for preventing the dialing of certain telephone numbers in accordance with claim 1 including means to disable the apparatus so that all telephone numbers can be dialed.

7. Apparatus for preventing the dialing of certain telephone numbers in accordance with claim 6 wherein said means to disable the apparatus includes a key operated mechanism.

8. Apparatus for preventing the dialing of certain telephone numbers in accordance with claim 1 including means to prevent completion of any call until a coin has been deposited.

9. Apparatus for preventing the dialing of certain telephone numbers in accordance with claim 8 wherein said means to prevent the completion of any call includes means for acoustically coupling a utility telephone hand set to a toll mechanism hand set through electronic circuitry.

10. Apparatus for preventing the dialing of certain telephone numbers in accordance with claim 8 wherein said means to prevent completion of any call includes means to disable the same so that a call can be made without depositing a coin.

* * * * *

UNITED STATES PATENT OFFICE
CERTIFICATE OF CORRECTION

Patent No. 3,748,402 Dated July 24, 1973

Inventor(s) Albert Yussen

It is certified that error appears in the above-identified patent and that said Letters Patent are hereby corrected as shown below:

Column 9, line 14, before "having", insert --said apparatus--.

Column 9, line 14, before "finger", cancel "said apparatus".

Column 9, line 18, cancel "has," and substitute therefor a comma (,).

Signed and sealed this 19th day of November 1974.

(SEAL)
Attest:

McCOY M. GIBSON JR.
Attesting Officer

C. MARSHALL DANN
Commissioner of Patents